No. 633,070. Patented Sept. 12, 1899.
W. BYLANDT-RHEYDT.
BICYCLE PACKING CASE.
(Application filed Feb. 12, 1898.)

(No Model.)

Witnesses.
Philipp v. Hertling
T. Hm...

Inventor.
Wilhelm count of Bylandt-Rheydt
per Heinrich Lade
Attorney

UNITED STATES PATENT OFFICE.

WILHELM BYLANDT-RHEYDT, OF WEIMAR, GERMANY.

BICYCLE PACKING-CASE.

SPECIFICATION forming part of Letters Patent No. 633,070, dated September 12, 1899.

Application filed February 12, 1898. Serial No. 670,120½. (No model.)

*To all whom it may concern:*

Be it known that I, WILHELM COUNT OF BYLANDT-RHEYDT, residing in the city of Weimar, Germany, have invented certain new and useful Improvements in Bicycle Packing-Cases; and I do hereby declare that the following is a full, clear, and exact description of the invention, which will enable others skilled in the art to which it appertains to make and use the same.

My invention relates to improvements in bicycle packing-cases.

Hitherto bicycle packing-cases have been constructed of open lath or willow work and the bicycle introduced therein at the top. This method of packing is inconvenient, and the bicycle is exposed to external influences.

The object of my invention is to remove this disadvantage by constructing the packing-case so that the bicycle is introduced therein at the side and there covered over.

My invention consists of a packing-case for the transport and storage of bicycles consisting of a body or box having a contour corresponding to the contour of the bicycle, to which body a closing side or cover is attached in the manner that the bicycle can be placed in said body or box and the cover side then closed thereon.

The bicycle packing-case of the invention is shown in the accompanying drawings.

Figure 1:
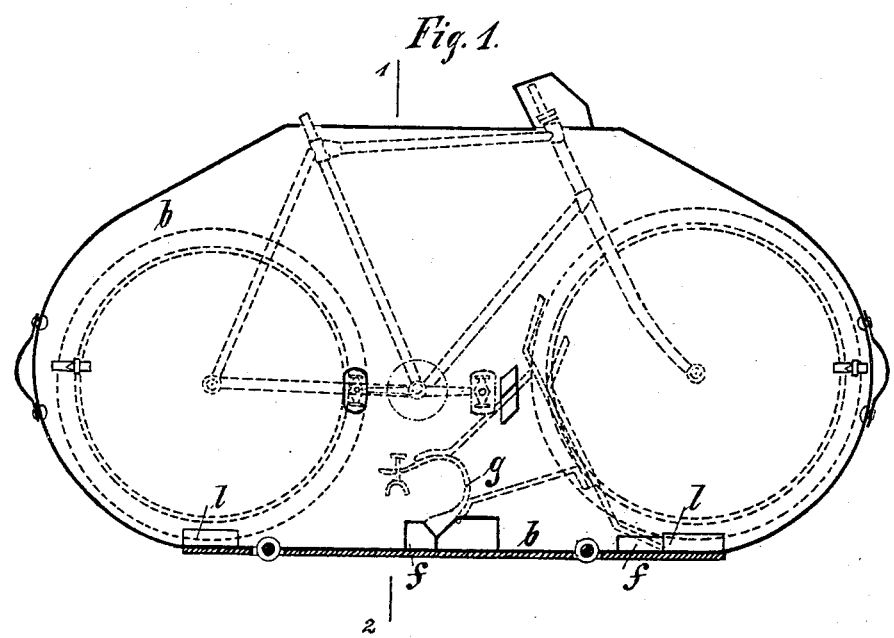
Figure 2:
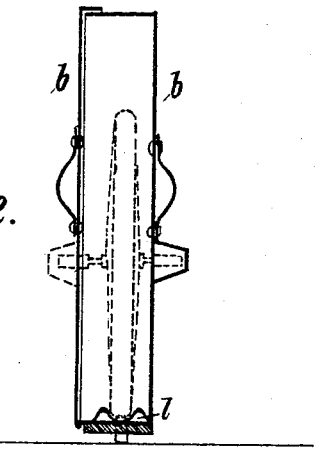

Figure 1 shows the packing-case in a section with a bicycle placed therein, and Fig. 2 a vertical section on line 1 2 of Fig. 1.

$a$ is the main body of the packing-case into which the bicycle is introduced, and $b$ the sides of the same, the whole having a contour corresponding to the form of the bicycle with only the top of the steering-rod and saddle-rod protruding. For the latter an additional covering part $b'$ may be attached to the body $a$. In this way the packing-case is kept as small as possible.

To the body $a$ is hinged the opposite and closing side of the packing-case, and adjacent to the hinges the case is provided at the bottom with rollers or small wheels on which it may be moved from place to place, thereby facilitating its transport. Suitable handles are provided, as shown, for holding and lifting the case. Inside the case is provided at bottom with suitable fittings for holding the bicycle in position, such as grooved blocks $e$ for the reception of the wheel-tires and blocks $f$, having holes in which are fixed the foot of the frame of the wheel-support $g$, which latter may be removable or fixed in the case.

The packing-case may be made of light boards covered with canvas or leather, or of pasteboard covered with canvas, or of any other suitable material.

Having now particularly described and ascertained the nature of my said invention and in what manner the same is to be performed, I declare that what I claim is—

A packing-case for the transport and storage of bicycles consisting of a body or box like part $a$ having a contour corresponding to the contour of the bicycle to which body a closing side or cover is attached in the manner that the bicycle can be placed in said body or box and the cover side then closed thereon and which body $a$ is provided with rollers or small wheels and with grooved blocks $e$ for the reception of the wheel-tires, substantially as described and shown.

In testimony whereof I sign this specification in the presence of two subscribing witnesses.

WILHELM COUNT OF BYLANDT-RHEYDT.

Witnesses:
PAUL TSCIHMANN,
GEORGE V. HESBERG.